(12) United States Patent
Tamura

(10) Patent No.: US 9,392,631 B2
(45) Date of Patent: Jul. 12, 2016

(54) WIRELESS COMMUNICATION APPARATUS

(75) Inventor: Toshiya Tamura, Kokubunji (JP)

(73) Assignee: FUJITSU MOBILE COMMUNICATIONS LIMITED, Kawasaki (JP)

(*) Notice: Subject to any disclaimer, the term of this patent is extended or adjusted under 35 U.S.C. 154(b) by 486 days.

(21) Appl. No.: 13/568,420

(22) Filed: Aug. 7, 2012

(65) Prior Publication Data

US 2013/0052955 A1 Feb. 28, 2013

(30) Foreign Application Priority Data

Aug. 24, 2011 (JP) .................................. 2011-182810

(51) Int. Cl.
| | |
|---|---|
| *H04W 84/12* | (2009.01) |
| *H04W 36/00* | (2009.01) |
| *H04W 76/02* | (2009.01) |
| *H04W 88/06* | (2009.01) |
| *H04W 76/06* | (2009.01) |

(52) U.S. Cl.
CPC .......... *H04W 76/025* (2013.01); *H04W 76/064* (2013.01); *H04W 88/06* (2013.01)

(58) Field of Classification Search
CPC . H04W 76/025; H04W 88/06; H04W 76/064; H04W 84/12; H04W 36/00; H04W 36/385
USPC ....................... 455/41.2, 432.1–442; 370/328, 370/338–339; 999/41.2, 432.1–442
See application file for complete search history.

(56) References Cited

U.S. PATENT DOCUMENTS

2010/0254349 A1 10/2010 Aibara et al.
2012/0020348 A1* 1/2012 Haverinen et al. ............ 370/339

FOREIGN PATENT DOCUMENTS

| EP | 2051551 | 4/2009 |
| JP | 2011-035632 A | 2/2011 |
| WO | 2009018361 | 2/2009 |

OTHER PUBLICATIONS

"AMP Manager Protocol Specification" Core System Package Part E, BlueTooth Specification Version 3.0, Apr. 21, 2009.
IEEE Standard for Information technology—Telecommunications and information exchange between systems Local and metropolitan area networks—Specific requirements Part 11: Wireless LAN Medium Access Control (MAC) and Physical Layer (PHY) Specifications, Jan. 17, 2011.

(Continued)

*Primary Examiner* — Pablo Tran
(74) *Attorney, Agent, or Firm* — Maschoff Brennan

(57) ABSTRACT

A wireless communication apparatus carries out a first data transfer in a first wireless communication method to another apparatus using a physical layer and a data link layer of the first wireless communication method, carries out a second data transfer of a higher speed than the first data transfer to the other apparatus in the first wireless communication method using a physical layer and a data link layer of a second wireless communication method, and further carries out a third data transfer to the other apparatus in the second wireless communication method using the physical layer and data link layer of the second wireless communication method; and limits operations of carrying out the third data transfer by the physical layer and data link layer of the second wireless communication method when an instruction for the second data transfer is given.

9 Claims, 10 Drawing Sheets

(56) References Cited

OTHER PUBLICATIONS

Abhishek Bit et al.,Bit A et al: "Comparative analysis of Bluetooth 3.0 with UWB and Certified Wireless-USB protocols", Ultra-Wideband (ICUWB), 2010 IEEE International Conference on, IEEE, Piscataway, NJ, USA, Sep. 20, 2010, pp. 1-4, XP031785232, ISBN: 978-1-4244-5305-4 * Section I, II.I *.

Extended European Search Report dated Aug. 31, 2015 issued with respect to the corresponding European Patent Application No. 12179511.6.

* cited by examiner

WIRELESS COMMUNICATION APPARATUS

CROSS-REFERENCE TO RELATED APPLICATIONS

This application is based upon and claims the benefit of priority of the prior Japanese Patent Application No. 2011-182810, filed on Aug. 24, 2011, the entire contents of which are incorporated herein by reference.

FIELD

The embodiments discussed herein are directed to wireless communication apparatuses including mobile communication terminal apparatuses.

BACKGROUND

Recently, a 2.4 GHz band has been used by wireless apparatuses such as those using Bluetooth (registered trademark), Wireless Local Area Network (WLAN) and so forth.

"Bluetooth (registered trademark) 3.0+HS (High Speed)" is a standard (see Non-Patent reference No. 1, mentioned later) for achieving high speed data communication of Bluetooth (registered trademark, hereinafter simply referred to as "BT") that is a short distance wireless communication method. According to "BT3.0+HS", both conventional BT and WLAN are made to be used in parts corresponding to a physical layer and a data link layer. Then, when a large amount of data is transferred at a high speed, switching will be carried out from BT to WLAN. WLAN has been standardized in Non-Patent reference No. 2, mentioned later.

It is noted that BT3.0+HS has adopted the following two technologies to deal with a communication method of WLAN. The first thereof is Alternate Media access control and Physical (AMP), and the second thereof is Protocol Adaptation Layer (PAL). In a case where a large amount of data will be actually transferred at a high speed, BT is used to connect apparatuses together which transfer the data therebetween. After that, in order to transfer the large amount of data between the apparatuses, an application switches a communication method from BT to WLAN. In the switching, AMP is used to exchange data and/or commands between a BT application and a physical layer of WLAN. PAL is used to convert data to be transmitted and/or commands of BT into those that can be used in WLAN.

The following wireless communication apparatus has been proposed (for example, see Patent reference No. 1, mentioned later). In the proposed wireless communication apparatus, a controller part carries out BT (BR/EDR) communication and carries out communication processes on signals of BT (BR/EDR) and BT (WLAN). Then, any one of BT (BR/EDR) and BT (WLAN) is selected and a management part generates a transmission signal. A WLAN communication control part carries out transmission control of a WLAN transmission signal and a BT (WLAN) signal and a WLAN wireless part transmits and receives the WLAN signal and the BT (WLAN) signal. In a case where the BT (WLAN) signal is received by the WLAN wireless part, the signal is output to the management part. In a case where the WLAN signal is received by the WLAN wireless part, the signal is output to a bridge part.

PATENT REFERENCE

Patent reference No. 1: Japanese Laid-Open Patent Application No. 2011-35632

Non-Patent Reference

Non-Patent reference No. 1: Bluetooth Specification version 3.0+HS

Non-Patent reference No. 2: IEEE Std 802.11 (2007)

In a mobile communication terminal apparatus that supports BT3.0+HS and WLAN, a MAC/PHY layer of WLAN operates in both a high speed mode of BT3.0+HS (HS mode) and WLAN. A case will now be described where as depicted in FIG. 1, a moving picture will be transmitted to a mobile communication terminal apparatus 1 that supports BT3.0+HS and WLAN, from another apparatus 2 that supports BT3.0+HS and WLAN.

First, a connection is established between a BT LC/BB 2a that is a physical layer and a data link layer for BT in the apparatus 2 and a BT LC/BB 1a of the mobile communication terminal apparatus 1. After that, a WLAN MAC/PHY 2b that is a physical layer and a data link layer for WLAN in the apparatus 2 and a WLAN MAC/PHY 1b of the mobile communication terminal apparatus 1 are connected together and a moving picture is transmitted and received therebetween. It is noted that the mobile communication terminal apparatus 1 is connected to, for example, the Internet that is a public network via a wireless base station 4.

However, the following problematic situation may occur. That is, during the establishment of connection of the physical layers and data link layers for BT, 2a and 1a, between the apparatus 2 and the mobile communication terminal apparatus 1 as depicted in FIG. 2, the WLAN MAC/PHY 1b of the mobile communication terminal apparatus 1 is visible to a WLAN MAC/PHY 3a of yet another apparatus 3 that supports WLAN. Therefore, there is a case where during the above-mentioned establishment of connection of the physical layers and data link layers for BT, 2a and 1a, the WLAN MAC/PHY 3a of the apparatus 3 connects itself with the WLAN MAC/PHY 1b of the mobile communication terminal apparatus 1. In this case, after the establishment of connection of the physical layers and data link layers for BT, 2a and 1a, the WLAN MAC/PHY 2b of the apparatus 2 cannot be connected with the WLAN MAC/PHY 1b of the mobile communication terminal apparatus 1. In other words, the WLAN MAC/PHY 2b of the apparatus 2 cannot be connected with the WLAN MAC/PHY 1b of the mobile communication terminal apparatus 1 unless waiting for the WLAN MAC/PHY 3a of the apparatus 3 disconnects itself from the WLAN MAC/PHY 1b of the mobile communication terminal apparatus 1.

SUMMARY

A wireless communication apparatus according to one embodiment of the present invention includes a data transfer part configured to carry out a first data transfer in a first wireless communication method to another apparatus using a physical layer and a data link layer of the first wireless communication method, carry out a second data transfer of a higher speed than the first data transfer to the other apparatus in the first wireless communication method using a physical layer and a data link layer of a second wireless communication method different from the first wireless communication method, and further carry out a third data transfer to the other apparatus in the second wireless communication method using the physical layer and data link layer of the second wireless communication method; and an operation limitation part configured to limit operations of carrying out the third data transfer by the physical layer and data link layer of the second wireless communication method when an instruction to carry out the second data transfer is given.

The object and advantages of the disclosure will be realized and attained by means of the elements and combinations particularly pointed out in the claims.

It is to be understood that both the foregoing general description and the following detailed description are exemplary and explanatory only and are not restrictive of the invention, as claimed.

DESCRIPTION OF EMBODIMENTS

Below, the embodiments of the present invention will be described using figures.

<Hardware Configuration of Mobile Communication Terminal Apparatus>

Figure 1:
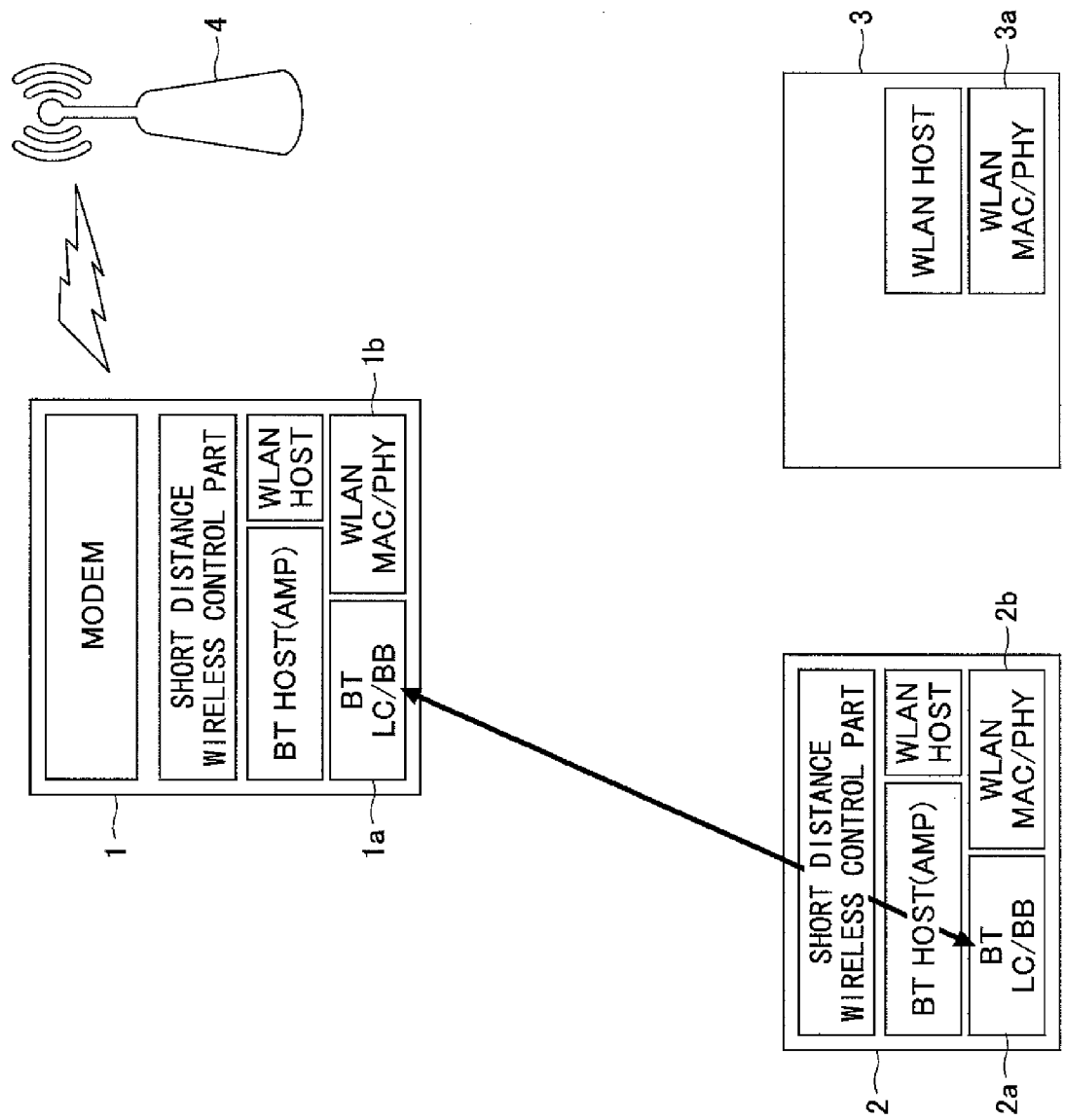
FIGS. 1 and 2 illustrate a problem in the related art.
Figure 2:
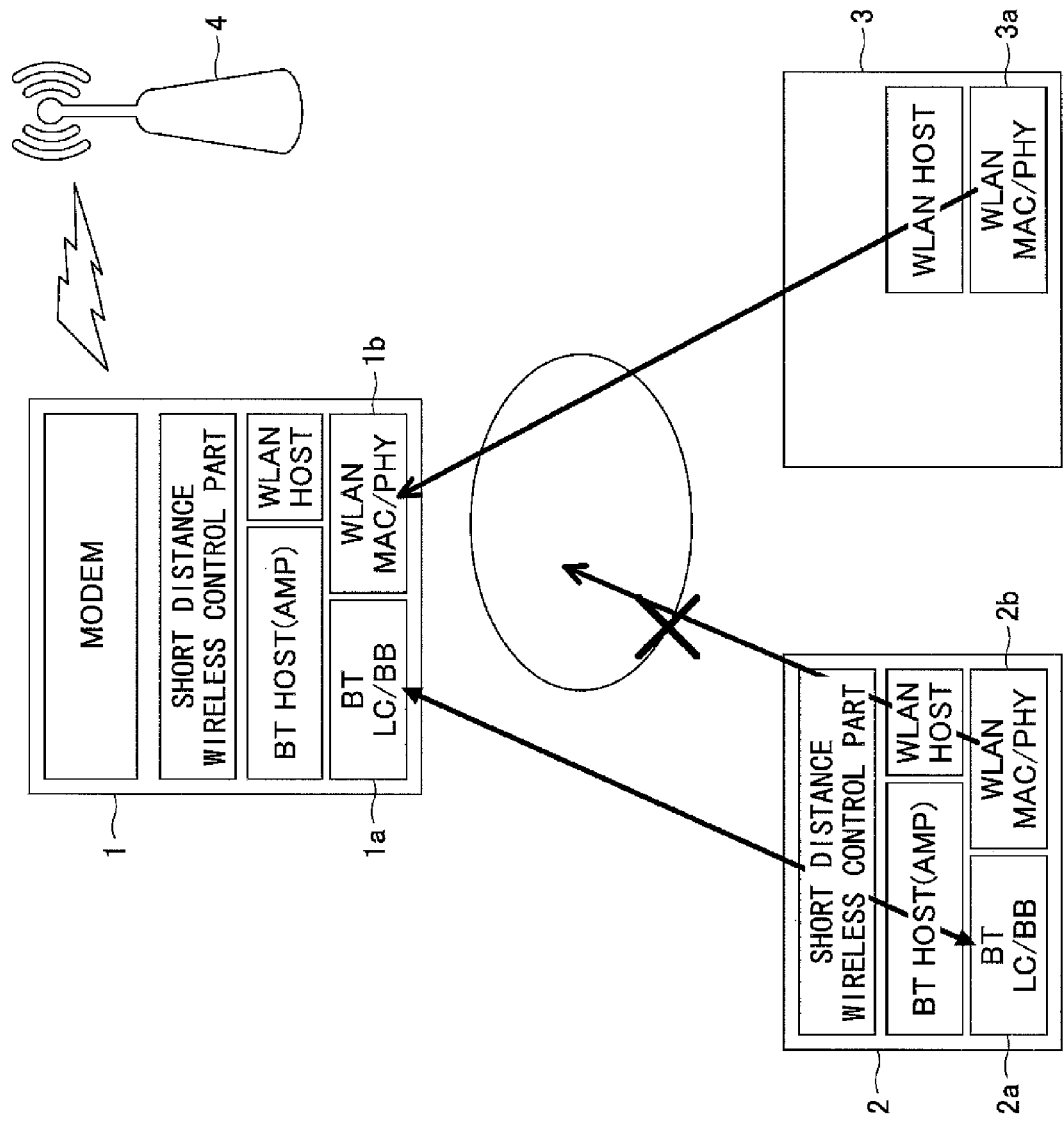
Figure 3:
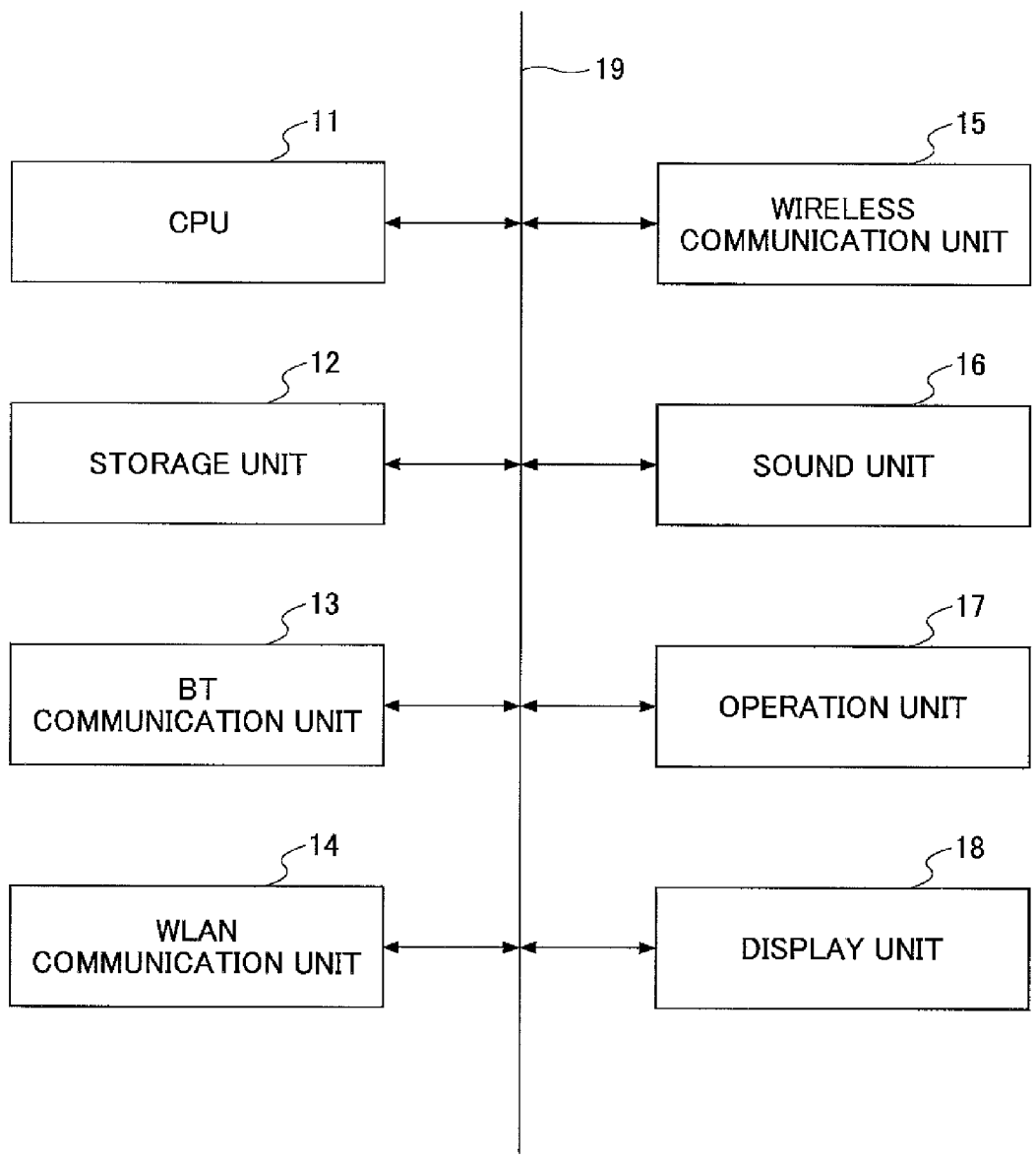
FIG. 3 is a hardware configuration diagram of a mobile communication terminal apparatus in one embodiment of the present invention.

FIG. 3 is a hardware configuration diagram of one embodiment of a mobile communication terminal apparatus. In FIG. 3, a mobile communication terminal apparatus 10 includes a central processing unit (CPU) 11, a storage unit 12, a BT communication unit 13, a WLAN communication unit 14, a wireless communication unit 15, a sound unit 16, an operation unit 17 and a display unit 18. These units 11 through 18 are mutually connected by a bus 19.

The CPU 11 executes various process programs stored in the storage unit 12. Thus, the CPU 11 performs processes of controlling the respective units of the apparatus, processes of coding and decoding transmission/reception signals, BT/WLAN processes using the BT communication unit 13 or the WLAN communication unit 14, and so forth. Further, the CPU 11 stores various sorts of information including transmission/reception data and setting information in the storage unit 12.

The BT communication unit 13 transmits data to and/or receives data from a BT communication unit of another apparatus such as a personal computer or another mobile communication terminal apparatus through short distance wireless communication using Bluetooth (registered trademark). The WLAN communication unit 14 transmits data to and/or receives data from another apparatus such as a personal computer through WLAN.

The wireless communication unit 15 carries out wireless communication with a base station (not depicted). The wireless communication unit 15 modulates a transmission signal provided by the CPU 11 or the sound unit 16 and transmits the modulated signal to the base station via an antenna (not depicted), or demodulates a reception signal received from the base station via the antenna and provides the demodulated signal to the CPU 11 or the sound unit 16.

The sound unit 16 digitizes an analog sound signal converted by a microphone (not depicted) and provides the digital signal to the wireless communication unit 15 or the CPU 11, or converts a digital sound signal provided by the wireless communication unit 15 or the CPU 11 into an analog signal and causes a speaker (not depicted) to generate a sound.

The operation unit 17 has various keys such as a ten key, a telephone call key, a selection key, a determination key, a clear key, and so forth, and an input to the operation unit 17 is provided to the CPU 11. The display unit 18 displays screen pages of various character/letter information, image information and so forth under the control of the CPU 11.

<Configuration of BT/WLAN Process Function>

Figure 4:
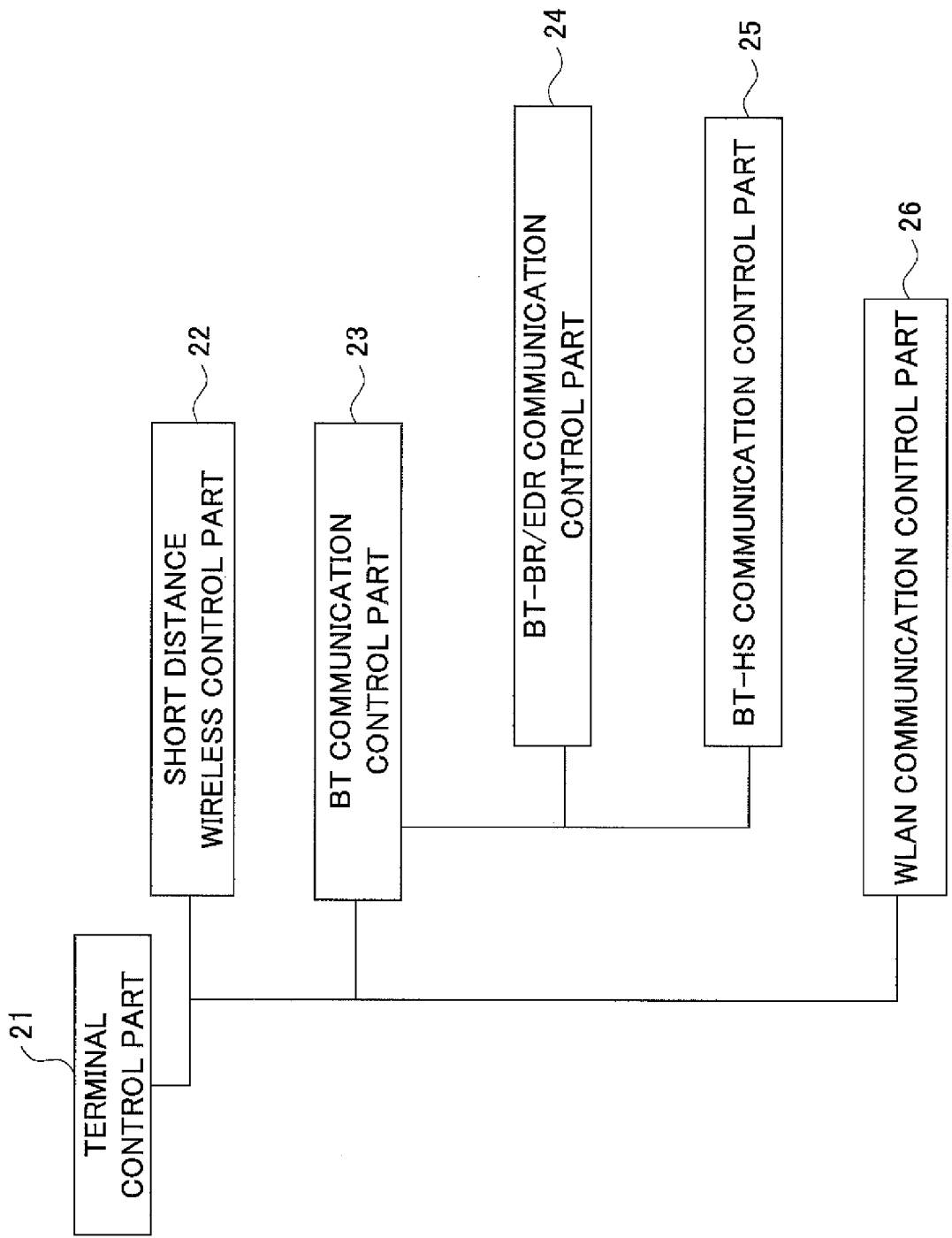
FIG. 4 is a functional configuration diagram of a BT/WLAN process function in one embodiment of the present invention.

FIG. 4 a functional configuration diagram of a BT/WLAN process function in one embodiment of the present invention performed by a program that is executed by the CPU 11. In FIG. 4, a terminal control part 21 controls the entire software of the mobile communication terminal apparatus. That is, the terminal control part 21 also controls a short distance wireless control part 22, a BT communication control part 23, a WLAN communication control part 26 and also, the wireless communication unit 15.

The short distance wireless control part 22 carries out exclusive control of the BT communication control part 23 and the WLAN communication control part 26. That is, the short distance wireless control part 22 carries out control such that another apparatus that expects operations of WLAN cannot connect itself with the WLAN MAC/PHY (of the mobile communication terminal apparatus) which operates in a high speed mode of BT3.0+HS. Further, the short distance wireless control part 22 carries out control such that another apparatus that expects operations of a high speed mode of BT3.0+HS is prevented from requesting a connection to the WLAN MAC/PHY (of the mobile communication terminal apparatus) which operates in a WLAN mode.

The BT communication control part 23 carries out control of switching between a BT-BR/EDR communication control part 24 and a BT-HS communication control part 25, in other words, carries out AMP and carries out BT communication. The BT-BR/EDR communication control part 24 realizes existing BT2.1+BR (Basic Rate)/EDR (Enhanced Data Rate) communication. The BT-HS communication control part 25 realizes high speed communication of BT3.0+HS. Further, the WLAN communication control part 26 carries out control of WLAN communication prescribed in IEEE 802.11.

<Configuration of BT/WLAN Core Protocol>

Figure 5:
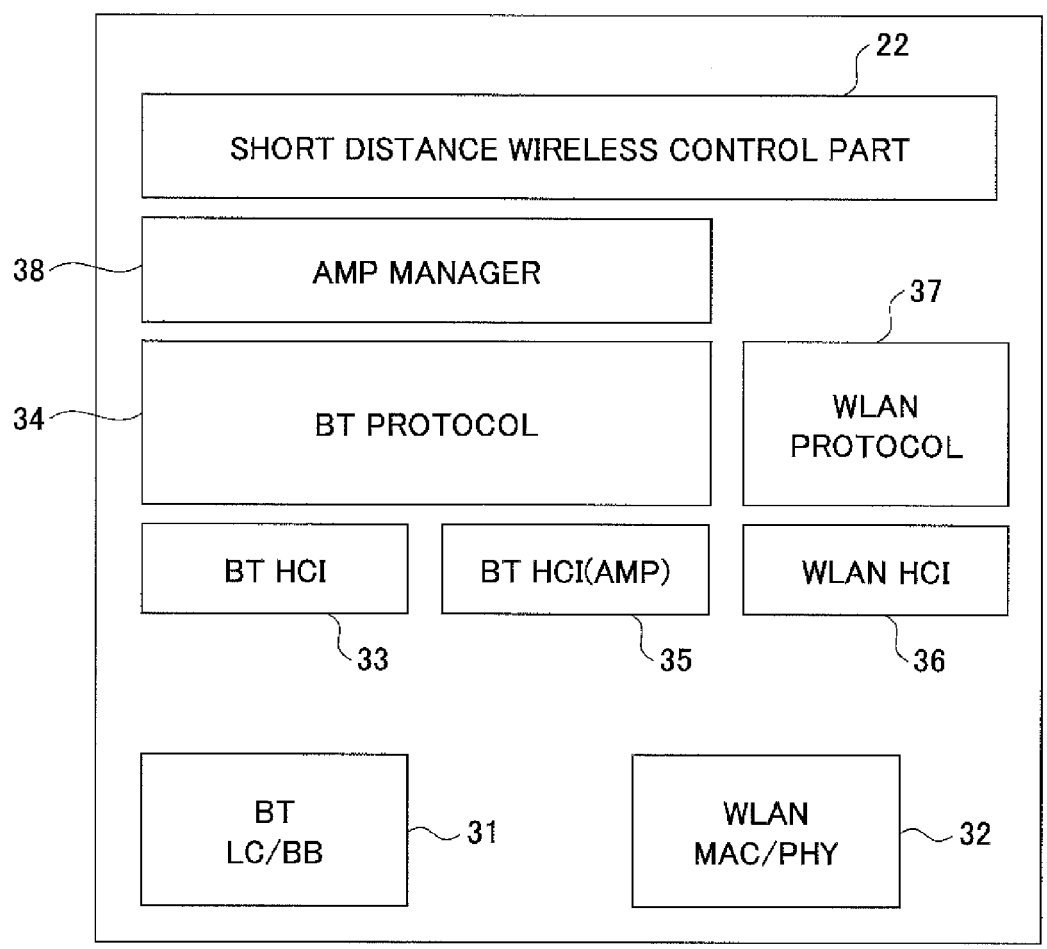
FIG. 5 is a configuration diagram of a BT/WLAN core protocol in one embodiment of the present invention.

FIG. 5 is a configuration diagram of a BT/WLAN core protocol in one embodiment of the present invention. In FIG. 5, a BT LC/BB (BaseBand/Link Controller) 31 that is a physical layer and a data link layer for BT uses radio waves provided by the physical layer (PHY) and provides a communication link to be used as a base of BT communication. Similarly, a WLAN MAC/PHY (Media Access Control/

PHYisical) 32 that is a physical layer and a data link layer for WLAN provides a communication link that is used as a base of WLAN communication.

A BT HCI (Host Controller Interface) 33 connects a BT protocol 34 to the BT LC/BB 31. The above-mentioned BT HCI 33 and BT protocol 34 realize the BT-BR/EDR communication control part 24 of FIG. 4.

A BT HCI (AMP) 35 connects the BT protocol 34 to the WLAN MAC/PHY 32. The above-mentioned BT HCI (AMP) 35 and BT protocol 34 realize the BT-HS communication control part 25 of FIG. 4.

Further, a WLAN HCI 36 connects a WLAN protocol 37 to the WLAN MAC/PHY 32. The above-mentioned WLAN HCI 36 and WLAN protocol 37 realize the WLAN communication control part 26 of FIG. 4.

An AMP manager 38 carries out control of switching between the BT-BR/EDR communication control part 24, i.e., the BT HCI 33 and BT protocol 34, and the BT-HS communication control part 25, i.e., the BT HCI (AMP) 35 and BT protocol 34, under the control of the short distance wireless control part 22. The above-mentioned AMP manager 38 realizes the BT communication control part 23 of FIG. 4.

<Sequence of First Embodiment>

Figure 6:
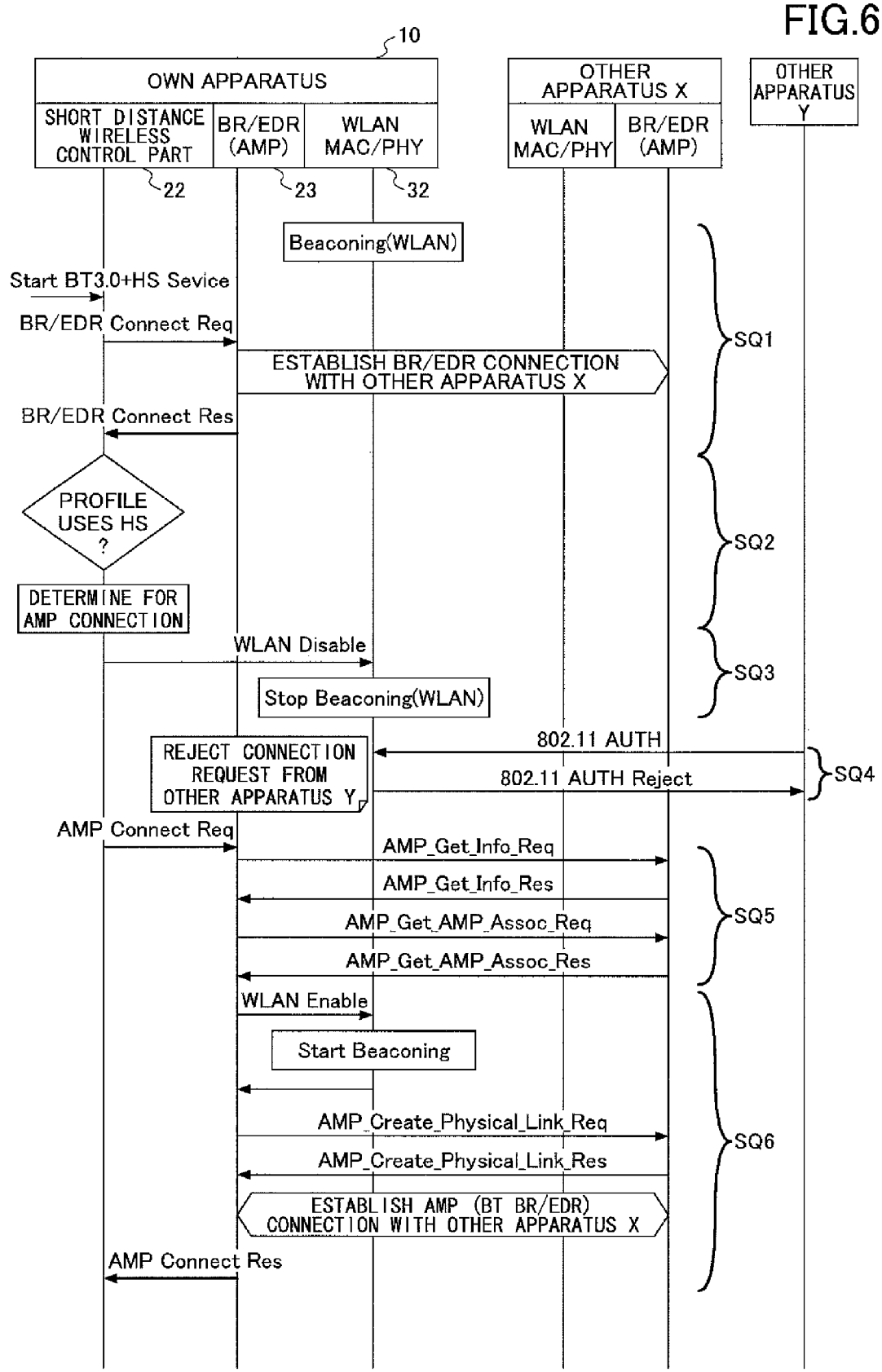
FIG. 6 is a sequence diagram of connecting between a mobile communication terminal apparatus and another apparatus in a high speed mode of BT3.0+HS in a first embodiment of the present invention.

FIG. 6 is a sequence diagram of connecting in a high speed mode of BT3.0+HS between a mobile communication terminal apparatus and another apparatus according to a first embodiment of the present invention.

In a sequence SQ1, an instruction to start a BT3.0+HS service is input via the operation unit 17 of a mobile communication terminal apparatus 10. The short distance wireless control part 22 of the mobile communication terminal apparatus 10 gives an instruction for a BR/EDR connection to the BT communication control part 23. Thereby, the BT-BR/EDR communication control part 24 transmits a BR/EDR connection request to another apparatus X. When a BR/EDR connection has been established with the apparatus X, the BT communication control part 23 reports a response of BR/EDR connection establishment to the short distance wireless control part 22. Thus, the BR/EDR connection is established between the mobile communication terminal apparatus 10 and the apparatus X.

It is noted that the mobile communication terminal apparatus 10 will be also referred to as an "own apparatus". Further, before the sequence SQ1, the WLAN communication control part 26 has been broadcasting a beacon for a WLAN physical link establishment request from the WLAN MAC/PHY 32 (Beaconing (WLAN)). The "beacon" is a frame for management transmitted by the WLAN MAC/PHY 32.

In a sequence SQ2, the short distance wireless control part 22 determines whether BT3.0+HS can be utilized according to a profile that uses the BR/EDR connection. When BT3.0+HS can be utilized according to the profile, the short distance wireless control part 22 determines to perform an AMP connection. It is noted that the "profile" is a standard of a protocol which is set for each of types of devices used when communication through BT is carried out.

In a sequence SQ3, when it has been determined to perform an AMP connection, the short distance wireless control part 22 prevents the WLAN MAC/PHY 32 of the WLAN communication control part 26 from carrying out WLAN communication prescribed in IEEE 802.11. Thereby, the WLAN communication control part 26 stops the broadcasting of the beacon from the WLAN MAC/PHY 32 (Stop Beaconing (WLAN)).

Next, in a sequence SQ4, even when a connection request for WLAN has been transmitted from yet another apparatus Y different from the apparatus X, the WLAN communication control part 26 rejects the WLAN connection request.

Thereafter, in a sequence SQ5, the short distance wireless control part 22 gives an instruction for an AMP connection to the BT communication control part 23. The BT communication control part 23 carries out a negotiation for an AMP connection with the apparatus X.

Next, in a sequence SQ6, the BT communication control part 23 gives an instruction for WLAN physical link establishment to the BT-HS communication control part 25. Thereby, the BT-HS communication control part 25 broadcasts a beacon for a WLAN physical link establishment request (Start Beaconing) from the WLAN MAC/PHY 32. Thereafter, the BT communication control part 23 transmits an AMP request to the apparatus X. Then, when a WLAN physical link has been established between the BT communication control part 23 and the apparatus X, the BT communication control part 23 reports a response of AMP connection establishment to the short distance wireless control part 22. Thus, an AMP connection is established between the mobile communication terminal terminal apparatus 10 and the apparatus X, and BT3.0+HS communication becomes available without delay.

<Sequence of Second Embodiment>

Figure 7:
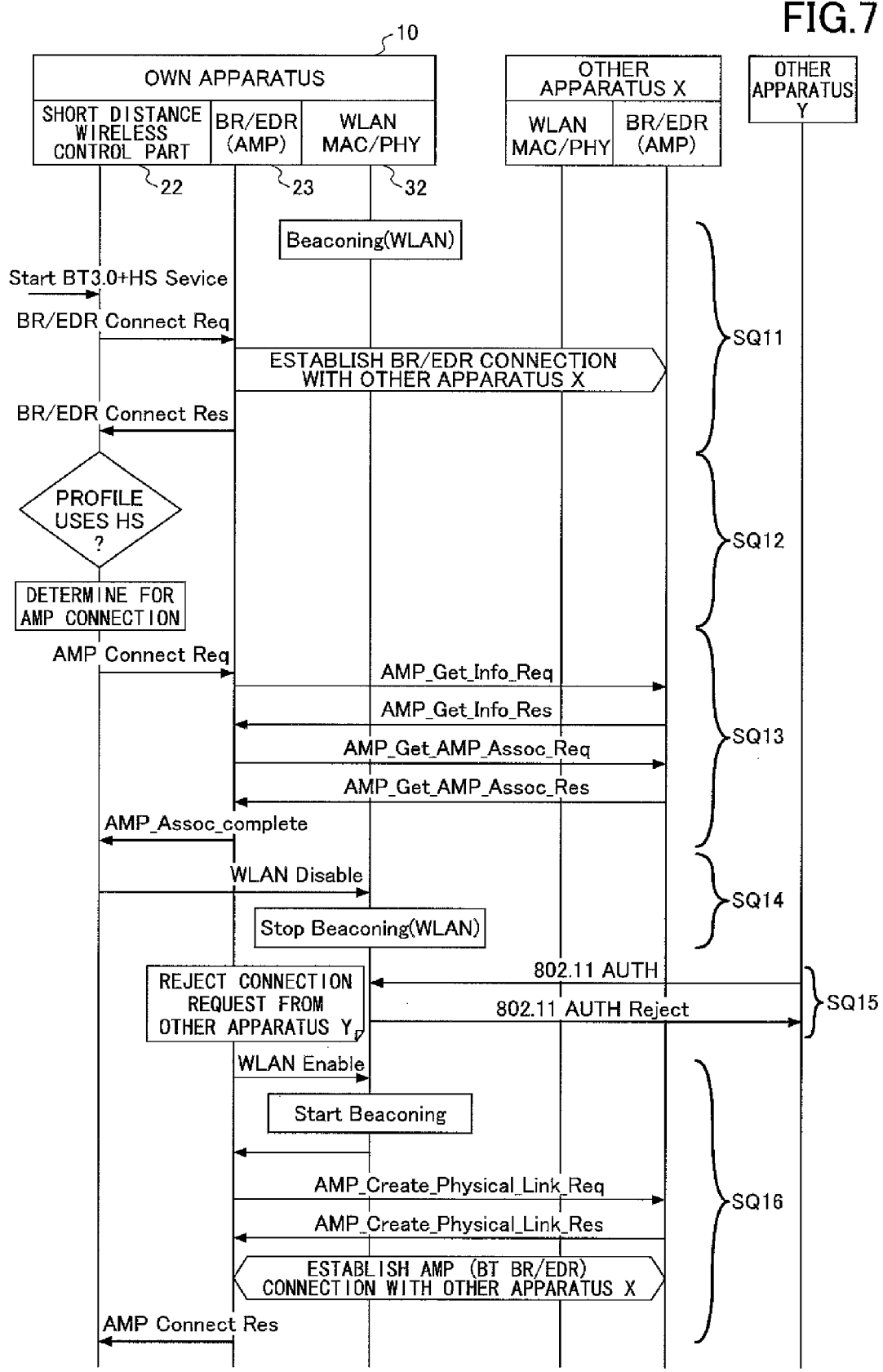
FIG. 7 is a sequence diagram of connecting between a mobile communication terminal apparatus and another apparatus in a high speed mode of BT3.0+HS in a second embodiment of the present invention.

FIG. 7 is a sequence diagram of connecting in a high speed mode of BT3.0+HS between a mobile communication terminal apparatus and another apparatus according to a second embodiment of the present invention.

In a sequence SQ11, an instruction to start a BT3.0+HS service is input via the operation unit 17 of a mobile communication terminal apparatus 10. The short distance wireless control part 22 of the mobile communication terminal apparatus 10 gives an instruction for a BR/EDR connection to the BT communication control part 23. Thereby, the BT-BR/EDR communication control part 24 transmits a BR/EDR connection request to another apparatus X. When a BR/EDR connection has been established with the apparatus X, the BT communication control part 23 reports a response of BR/EDR connection establishment to the short distance wireless control part 22. Thus, the BR/EDR connection is established between the mobile communication terminal apparatus 10 and the apparatus X.

It is noted that, before the sequence SQ11, the WLAN communication control part 26 has been broadcasting a beacon for a WLAN physical link establishment request from the WLAN MAC/PHY 32.

In a sequence SQ12, the short distance wireless control part 22 determines whether BT3.0+HS can be utilized according to a profile that uses the BR/EDR connection. When BT3.0+HS can be utilized according to the profile, the short distance wireless control part 22 determines to perform an AMP connection.

In a sequence SQ13, when it has been determined to perform an AMP connection, the short distance wireless control part 22 gives an instruction for an AMP connection to the BT communication control part 23. The BT communication control part 23 then carries out a negotiation for an AMP connection with the apparatus X, and reports to the short distance wireless control part 22 that the negotiation has been completed.

In a sequence SQ14, the short distance wireless control part 22 prevents the WLAN MAC/PHY 32 of the WLAN communication control part 26 from carrying out WLAN communication prescribed in IEEE 802.11.

Thereby, the WLAN communication control part 26 stops the broadcasting of the beacon from the WLAN MAC/PHY 32 (Stop Beaconing (WLAN)).

Next, in a sequence SQ15, even when a connection request for WLAN has been transmitted from yet another apparatus Y different from the apparatus X, the WLAN communication control part 26 rejects the WLAN connection request.

Thereafter, in a sequence SQ16, the BT communication control part 23 gives an instruction for WLAN physical link establishment to the BT-HS communication control part 25. Thereby, the BT-HS communication control part 25 broadcasts a beacon for a WLAN physical link establishment request from the WLAN MAC/PHY 32. Thereafter, the BT communication control part 23 transmits an AMP request to the apparatus X. Then, when a WLAN physical link has been established between the BT communication control part 23 and the apparatus X, the BT communication control part 23 reports a response of AMP connection establishment to the short distance wireless control part 22. Thus, an AMP connection is established between the mobile communication terminal apparatus 10 and the apparatus X, and BT3.0+HS communication becomes available without delay.

In the second embodiment, first a negotiation for an AMP connection is carried out, and when the negotiation has succeeded, the WLAN communication control part 26 rejects a connection request for WLAN from the apparatus Y. Therefore, it is possible to avoid uselessly rejecting a connection request for WLAN from the apparatus Y even in a case where an AMP connection with the apparatus X is not possible.

<Sequence of Third Embodiment>

Figure 8:
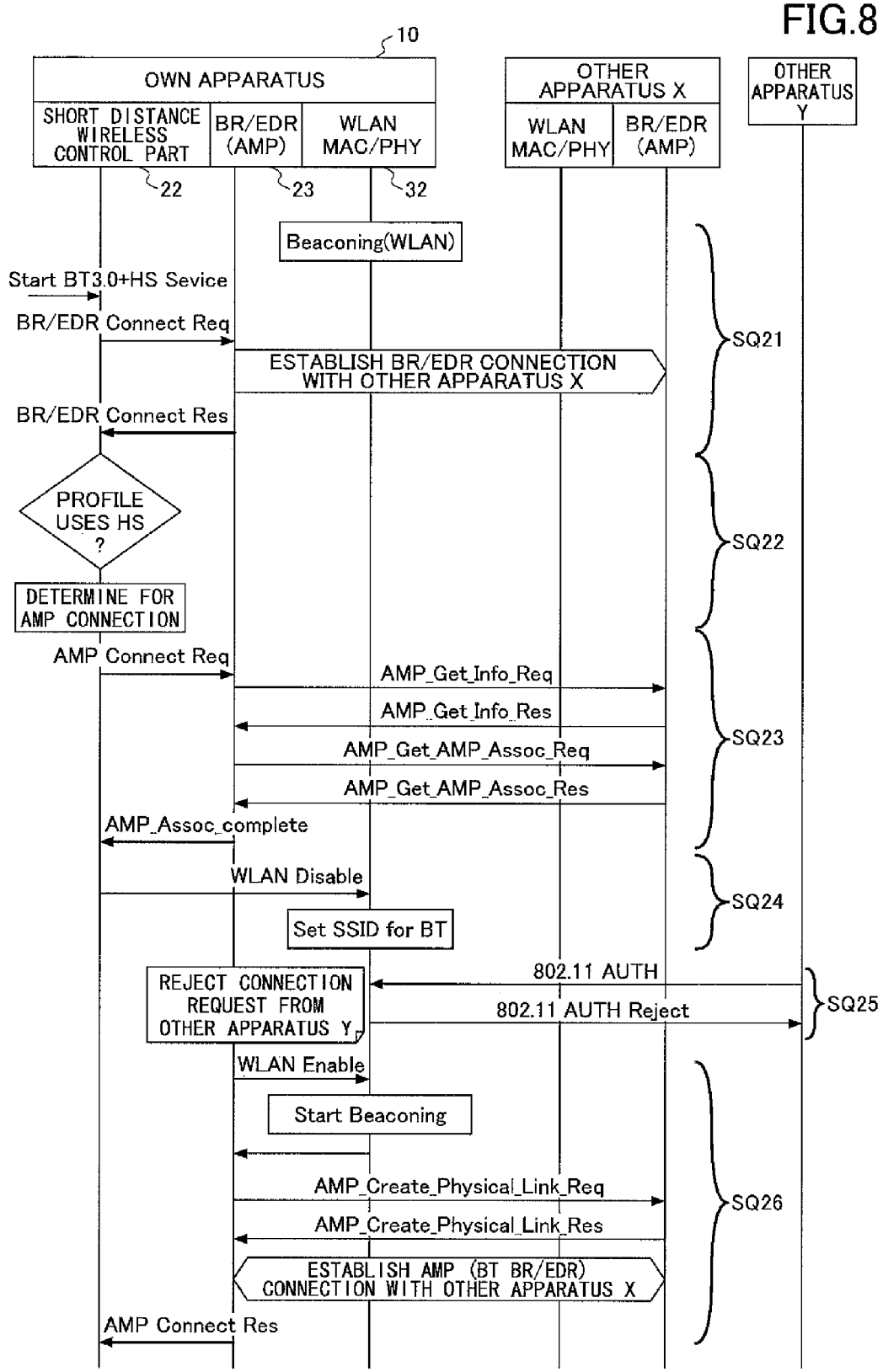
FIG. 8 is a sequence diagram of connecting between a mobile communication terminal apparatus and another apparatus in a high speed mode of BT3.0+HS in a third embodiment of the present invention.

FIG. 8 is a sequence diagram of connecting in a high speed mode of BT3.0+HS between a mobile communication terminal apparatus and another apparatus according to a third embodiment of the present invention.

In a sequence SQ21, an instruction to start a BT3.0+HS service is input via the operation unit 17 of a mobile communication terminal apparatus 10. The short distance wireless control part 22 of the mobile communication terminal apparatus 10 gives an instruction for a BR/EDR connection to the BT communication control part 23. Thereby, the BT-BR/EDR communication control part 24 transmits a BR/EDR connection request to another apparatus X. When a BR/EDR connection has been established with the apparatus X, the BT communication control part 23 reports a response of BR/EDR connection establishment to the short distance wireless control part 22. Thus, the BR/EDR connection is established between the mobile communication terminal apparatus 10 and the apparatus X.

It is noted that, before the sequence SQ21, the WLAN communication control part 26 has been broadcasting a beacon for a WLAN physical link establishment request from the WLAN MAC/PHY 32.

In a sequence SQ22, the short distance wireless control part 22 determines whether BT3.0+HS can be utilized according to a profile that uses the BR/EDR connection. When BT3.0+HS can be utilized according to the profile, the short distance wireless control part 22 determines to perform an AMP connection.

In a sequence SQ23, when it has been determined to perform an AMP connection, the short distance wireless control part 22 gives an instruction for an AMP connection to the BT communication control part 23. The BT communication control part 23 then carries out a negotiation for an AMP connection with the apparatus X, and reports to the short distance wireless control part 22 that the negotiation has been completed.

In a sequence SQ24, the short distance wireless control part 22 prevents the WLAN MAC/PHY 32 of the WLAN communication control part 26 from carrying out WLAN communication prescribed in IEEE 802.11. Thereby, the WLAN communication control part 26 broadcasts only a "SSID as AMP for BT" and publishes it so that a WLAN function is invisible to yet another apparatus Y. It is noted that "SSID" is an identification name of WLAN.

Next, in a sequence SQ25, even when a connection request for WLAN has been transmitted from the apparatus Y different from the apparatus X, the WLAN communication control part 26 rejects the WLAN connection request.

Next, in a sequence SQ26, the BT communication control part 23 gives an instruction for WLAN physical link establishment to the BT-HS communication control part 25. Thereby, the BT-HS communication control part 25 broadcasts a beacon for a WLAN physical link establishment request from the WLAN MAC/PHY 32. Thereafter, the BT communication control part 23 transmits an AMP request to the apparatus X. Then, when a WLAN physical link has been established between the BT communication control part 23 and the apparatus X, the BT communication control part 23 reports a response of AMP connection establishment to the short distance wireless control part 22. Thus, an AMP connection is established between the mobile communication terminal apparatus 10 and the apparatus X, and BT3.0+HS communication becomes available without delay.

For the above-mentioned first through third embodiments of the present invention, the cases have been described where the mobile communication terminal apparatus 10 acts as an access point, and the apparatus X acts as a station or a client. Below, cases will be described where a mobile communication terminal apparatus 10 acts as a station and another apparatus X acts as an access point.

<Sequence of Fourth Embodiment>

Figure 9:
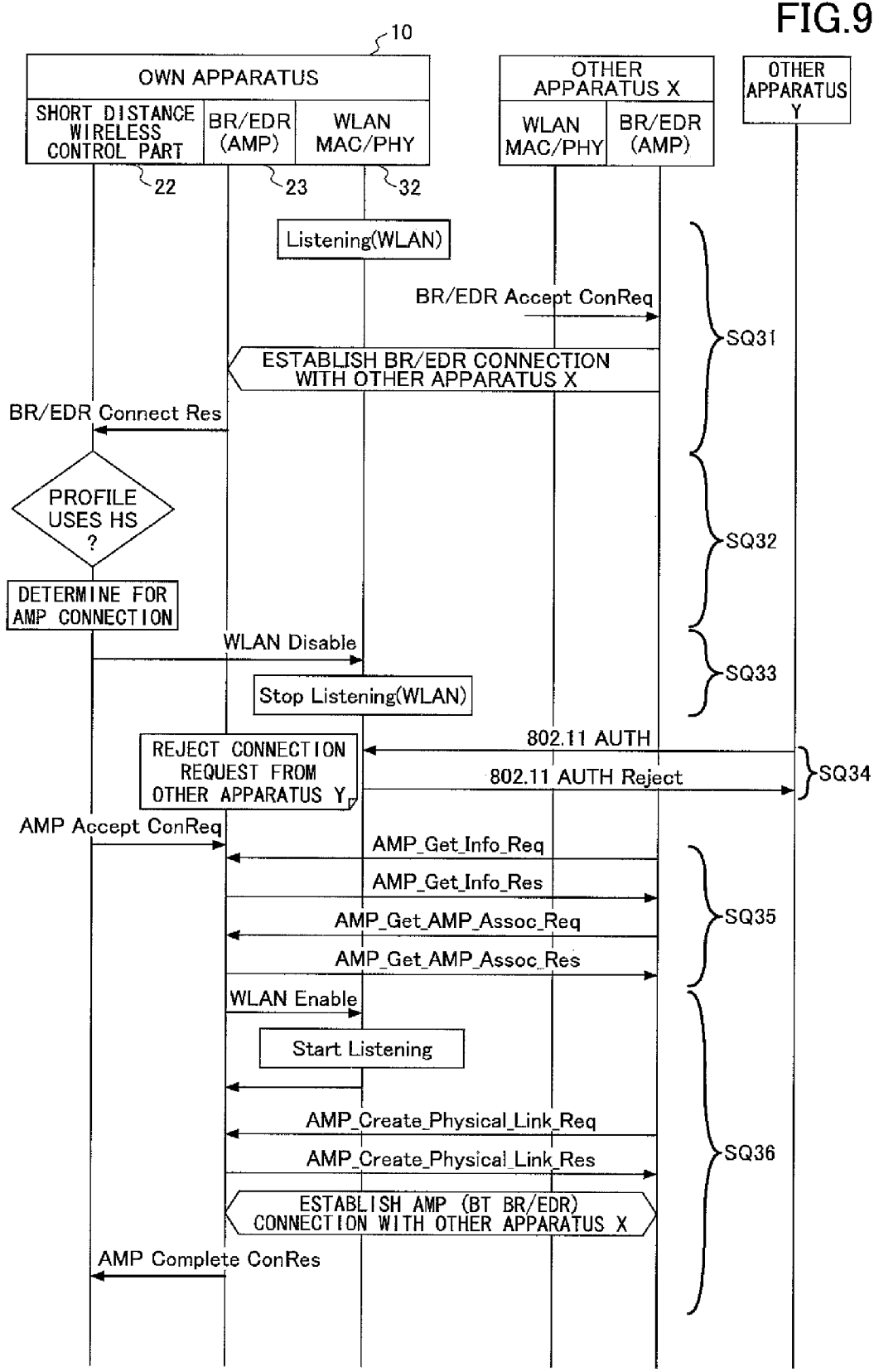
FIG. 9 is a sequence diagram of connecting between a mobile communication terminal apparatus and another apparatus in a high speed mode of BT3.0+HS in a fourth embodiment of the present invention.

FIG. 9 is a sequence diagram of connecting in a high speed mode of BT3.0+HS between a mobile communication terminal apparatus and another apparatus according to a fourth embodiment of the present invention. According to the fourth embodiment, the mobile communication terminal apparatus 10 in the first embodiment depicted in FIG. 6 is changed from an access point to a station.

In a sequence SQ31, an instruction to start a BT3.0+HS service is given to another apparatus X. Thereby, the apparatus X transmits a BR/EDR connection request to the BT-BR/EDR communication control part 24 of the mobile communication terminal apparatus 10. When a BR/EDR connection has been established with the apparatus X, the BT communication control part 23 of the mobile communication terminal apparatus 10 reports a response of BR/EDR connection establishment to the short distance wireless control part 22. Thus, the BR/EDR connection is established between the mobile communication terminal apparatus 10 and the apparatus X.

It is noted that, before the sequence SQ31, the WLAN communication control part 26 has caused the WLAN MAC/PHY 32 to enter a state of waiting for a WLAN physical link establishment request (Listening (WLAN)) for receiving a beacon for a WLAN physical link establishment request.

In a sequence SQ32, the short distance wireless control part 22 determines whether BT3.0+HS can be utilized according to a profile that uses the BR/EDR connection. When BT3.0+HS can be utilized according to the profile, the short distance wireless control part 22 determines to perform an AMP connection.

In a sequence SQ33, when it has been determined to perform an AMP connection, the short distance wireless control part 22 prevents the WLAN MAC/PHY 32 of the WLAN communication control part 26 from carrying out WLAN communication prescribed in IEEE 802.11. Thereby, the WLAN communication control part 26 causes the WLAN MAC/PHY 32 to stop an operation to receive a WLAN physical link establishment request and exit the state of waiting for a WLAN physical link establishment request (Stop Listening (WLAN)).

Next, in a sequence SQ34, even when a connection request for WLAN has been transmitted from yet another apparatus Y different from the apparatus X, the WLAN communication control part 26 rejects the WLAN connection request.

Thereafter, in a sequence SQ35, the short distance wireless control part 22 gives an instruction for an AMP connection to the BT communication control part 23. The BT communication control part 23 carries out a negotiation for an AMP connection with the apparatus X.

Next, in a sequence SQ36, the BT communication control part 23 gives an instruction for waiting for a WLAN physical link establishment request to the BT-HS communication control part 25. Thereby, the BT-HS communication control part 25 causes the WLAN MAC/PHY 32 to start an operation to receive a beacon for a WLAN physical link establishment request and enter a state of waiting for a WLAN physical link establishment request (Start Listening). Thereafter, the BT communication control part 23 receives an AMP request from the apparatus X. Then, when a WLAN physical link has been established between the BT communication control part 23 and the apparatus X, the BT communication control part 23 reports a response of AMP connection establishment to the short distance wireless control part 22. Thus, an AMP connection is established between the mobile communication terminal apparatus 10 and the apparatus X, and BT3.0+HS communication becomes available without delay.

<Sequence of Fifth Embodiment>

Figure 10:
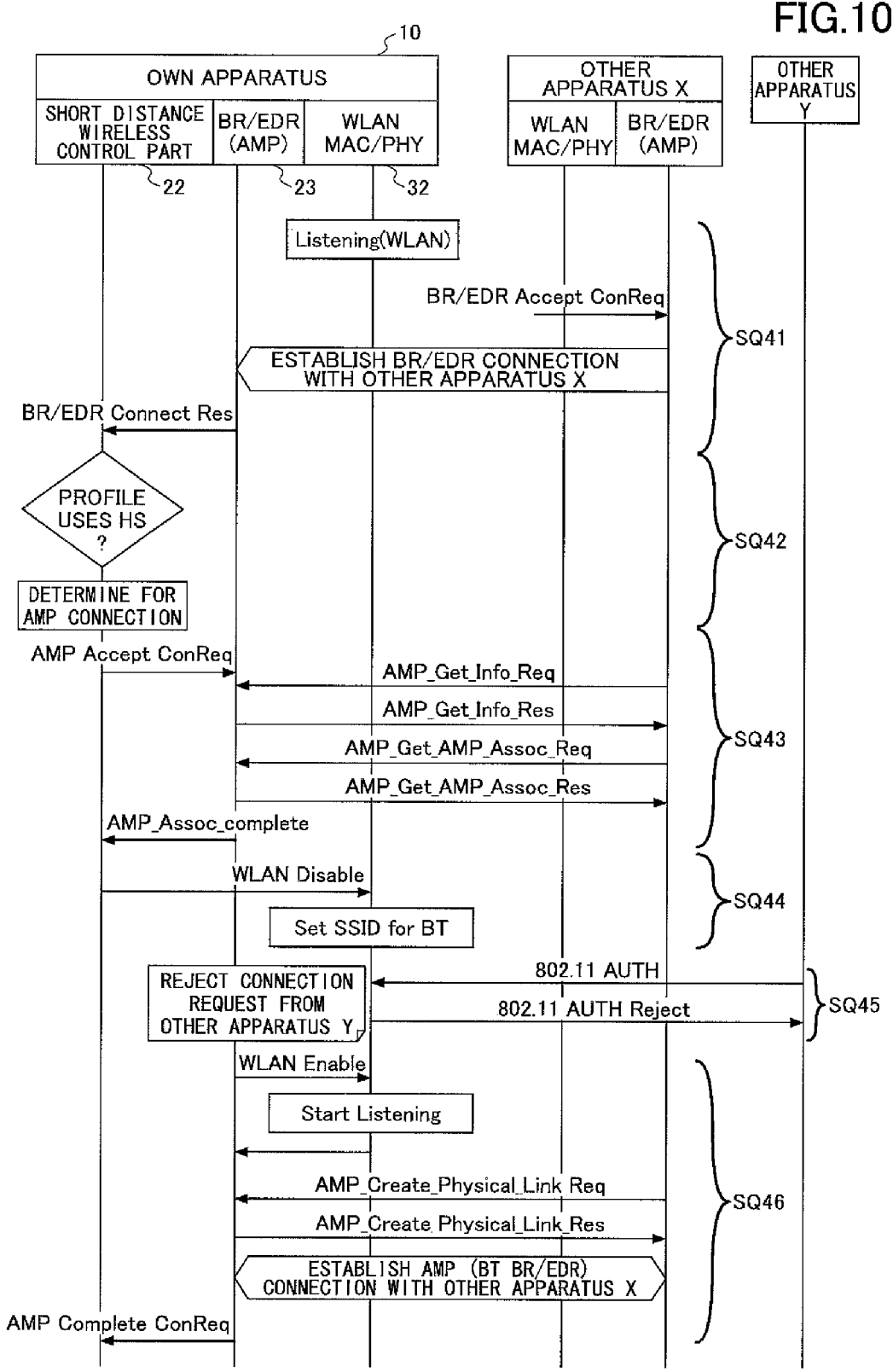
FIG. 10 is a sequence diagram of connecting between a mobile communication terminal apparatus and another apparatus in a high speed mode of BT3.0+HS in a fifth embodiment of the present invention.

FIG. 10 is a sequence diagram of connecting in a high speed mode of BT3.0+HS between a mobile communication terminal apparatus and another apparatus according to a fifth embodiment of the present invention. According to the fifth embodiment, the mobile communication terminal apparatus 10 in the third embodiment depicted in FIG. 8 is changed from an access point to a station.

In a sequence SQ41, an instruction to start a BT3.0+HS service is given to another apparatus X. Thereby, the apparatus X transmits a BR/EDR connection request to the BT-BR/EDR communication control part 24 of the mobile communication terminal apparatus 10. When a BR/EDR connection has been established with the apparatus X, the BT communication control part 23 of the mobile communication terminal apparatus 10 reports a response of BR/EDR connection establishment to the short distance wireless control part 22. Thus, the BR/EDR connection is established between the mobile communication terminal apparatus 10 and the apparatus X.

It is noted that, before the sequence SQ41, the WLAN communication control part 26 has caused the WLAN MAC/PHY 32 to enter a state of waiting for a WLAN physical link establishment request for receiving a beacon for a WLAN physical link establishment request.

In a sequence SQ42, the short distance wireless control part 22 determines whether BT3.0+HS can be utilized according to a profile that uses the BR/EDR connection. When BT3.0+HS can be utilized according to the profile, the short distance wireless control part 22 determines to perform an AMP connection.

In a sequence SQ43, when it has been determined to perform an AMP connection, the short distance wireless control part 22 gives an instruction for an AMP connection to the BT communication control part 23. The BT communication control part 23 then carries out a negotiation with the apparatus X for an AMP connection, and reports to the short distance wireless control part 22 that the negotiation has been completed.

In a sequence SQ44, the short distance wireless control part 22 prevents the WLAN MAC/PHY 32 of the WLAN communication control part 26 from carrying out WLAN communication prescribed in IEEE 802.11. Thereby, the WLAN communication control part 26 broadcasts only a "SSID as AMP for BT" so that the WLAN function is invisible to yet another apparatus Y.

Next, in a sequence SQ45, even when a connection request for WLAN has been transmitted from the apparatus Y different from the apparatus X, the WLAN communication control part 26 rejects the WLAN connection request.

Next, in a sequence SQ46, the BT communication control part 23 gives an instruction for waiting for a WLAN physical link establishment request to the BT-HS communication control part 25. Thereby, the BT-HS communication control part 25 causes the WLAN MAC/PHY 32 to start an operation to receive a beacon for a WLAN physical link establishment request and enter a state of waiting for a WLAN physical link establishment request. Thereafter, the BT communication control part 23 receives an AMP request from the apparatus X. Then, when a WLAN physical link has been established between the BT communication control part 23 and the apparatus X, the BT communication control part 23 reports a response of AMP connection establishment to the short distance wireless control part 22. Thus, an AMP connection is established between the mobile communication terminal apparatus 10 and the apparatus X, and BT3.0+HS communication becomes available without delay.

According to the above-mentioned embodiments of the present invention, a mobile communication terminal apparatus that supports BT3.0+HS and WLAN can carry out control to prevent another apparatus that expects operations of WLAN from connecting itself to a WLAN MAC/PHY (of the mobile communication terminal apparatus) which operates in a high speed mode of BT3.0+HS, and prevent another apparatus that expects operations of a high speed mode of BT3.0+HS from requesting a connection to the WLAN MAC/PHY (of the mobile communication terminal apparatus) which operates in a WLAN mode.

Further, according to the embodiments of the present invention, it is possible to carry out a second data transfer of a higher speed than a first data transfer without delay.

It is noted that for the above-mentioned embodiments, the mobile communication terminal apparatuses have been described as examples. However, embodiments of the present invention may be applied not only to such mobile communication terminal apparatuses but also to other types of apparatuses in a way the same or similar to the cases of the mobile communication terminal apparatuses as long as the apparatuses are wireless communication apparatuses that have a short distance wireless control part 22, a BT communication control part 23, a BT-BR/EDR communication control part 24, a BT-HS communication control part 25 and a WLAN communication control part 26 such as those described above using FIG. 4.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that various changes, substitutions, and alterations could be made hereto without departing from the spirit and scope of the invention.

What is claimed is:

1. A wireless communication apparatus, comprising:
a data transfer part configured to
carry out a Bluetooth Basic Rate/Enhanced Data Rate (BT+BR/EDR) communication with a first target communication apparatus according to a Bluetooth standard by using a first physical layer and a first data link layer of the Bluetooth standard,
carry out a Bluetooth High Speed (BT+HS) communication, at a speed higher than the BT+BR/EDR communication with to the first target communication apparatus according to the Bluetooth standard by using a second physical layer and a second data link layer of a Wireless Local Area Network (WLAN) standard, and
carry out a WLAN communication with to a second target communication apparatus according to the WLAN standard by using the second physical layer and the second data link layer of the WLAN standard; and
an operation limitation part configured to prevent the second physical layer and the second data link layer of the WLAN standard from being used for the WLAN communication, when an instruction to carry out the BT+HS communication is received.

2. The wireless communication apparatus as claimed in claim 1, wherein
in response to the instruction to carry out the BT+HS communication, the operation limitation part is configured to prevent the second physical layer and the second data link layer of the WLAN standard from being used for the WLAN communication before a negotiation for the BT+HS communication is carried out with the first target communication apparatus by using the BT+BR/EDR communication.

3. The wireless communication apparatus as claimed in claim 1, wherein
in response to the instruction to carry out the BT+HS communication, the operation limitation part is configured to prevent the second physical layer and the second data link layer of the WLAN standard from being used for the WLAN communication after a negotiation for the BT+HS communication is carried out with the first target communication apparatus by using the BT+BR/EDR communication.

4. The wireless communication apparatus as claimed in claim 1, wherein
in response to the instruction to carry out the BT+HS communication, the operation limitation part is configured to reject a request for the WLAN communication to the second physical layer and the second data link layer of the WLAN standard and accept a request for the BT+HS communication to the second physical layer and the second data link layer of the WLAN standard, after a negotiation for the BT+HS communication is carried out with the first target communication apparatus by using the BT+BR/EDR communication.

5. The wireless communication apparatus as claimed in claim 4, wherein
the operation limitation part is configured to publish to the first target communication apparatus an identification name of the second physical layer and the second data link layer of the WLAN standard, wherein the identification name is used for the BT+HS communication.

6. The wireless communication apparatus as claimed in claim 2, wherein
the operation limitation part is configured to stop transmitting a request for establishing a link from the second physical layer and the second data link layer of the WLAN standard and prevent operations of carrying out the WLAN communication.

7. The wireless communication apparatus as claimed in claim 3, wherein
the operation limitation part is configured to stop transmitting a request for establishing a link from the second physical layer and the second data link layer of the WLAN standard and prevent operations of carrying out the WLAN communication.

8. The wireless communication apparatus as claimed in claim 2, wherein
the operation limitation part is configured to stop an operation to receive a request for establishing a link by the second physical layer and the second data link layer of the WLAN standard and prevent operations of carrying out the WLAN communication.

9. The wireless communication apparatus as claimed in claim 3, wherein
the operation limitation part is configured to stop an operation to receive a request for establishing a link by the second physical layer and the second data link layer of the WLAN standard and prevent operations of carrying out the WLAN communication.

* * * * *